(No Model.)

A. W. HALL.
BICYCLE LOCK.

No. 470,836. Patented Mar. 15, 1892.

WITNESSES:
Henry J. Miller
Chas. H. Luther Jr.

INVENTOR:
Arthur W. Hall
by Joseph A. Miller & Co.
Attys

UNITED STATES PATENT OFFICE.

ARTHUR W. HALL, OF TAUNTON, MASSACHUSETTS.

BICYCLE-LOCK.

SPECIFICATION forming part of Letters Patent No. 470,836, dated March 15, 1892.

Application filed July 23, 1891. Serial No. 400,461. (No model.)

*To all whom it may concern:*

Be it known that I, ARTHUR W. HALL, of Taunton, in the county of Bristol and State of Massachusetts, have invented certain new and useful Improvements in Bicycle-Locks; and I hereby declare that the following is a full, clear, and exact description of the same, reference being had to the accompanying drawings, forming part of this specification.

This invention has reference to improvements in locking devices by which the wheel of a bicycle may be held against rotation.

The object of this invention is to produce a locking device which may be secured to some portion of the bicycle-frame and which may be readily locked or unlocked.

The invention consists in a spring-supported arm carrying a friction-bearing and movable in a slide, in combination with a locking device adapted to hold the movable arm in a position to force the friction-bearing against a portion of the wheel to be locked.

Figure 1:
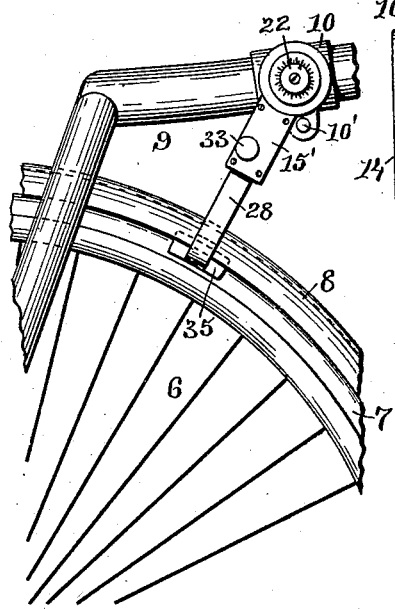
Figure 2:
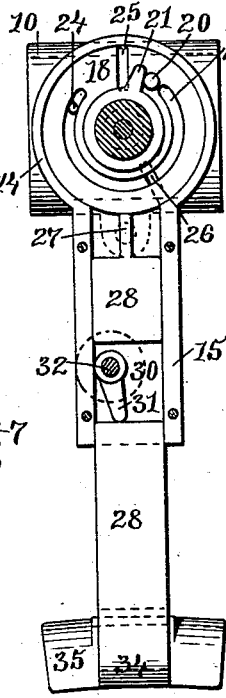
Figure 3:
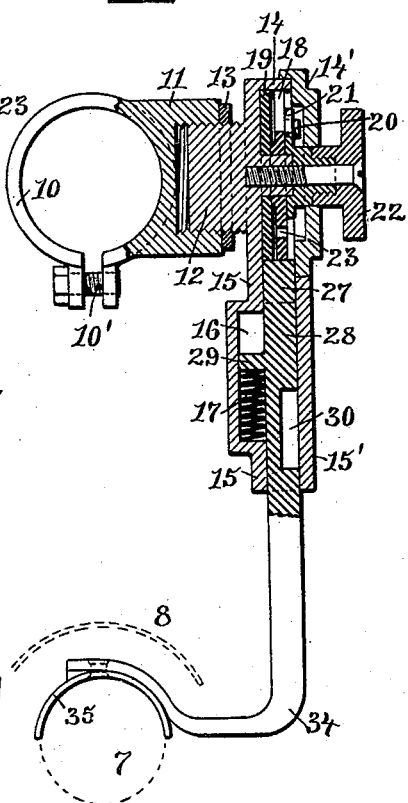
Figure 4:
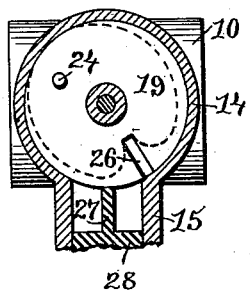
Figure 5:
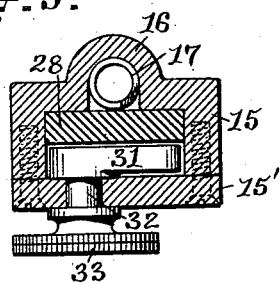

Figure 1 represents a view of a portion of a bicycle, showing the locking device secured thereto. Fig. 2 is a front view of the locking device, the front plates being removed to illustrate the interior construction. Fig. 3 is a vertical sectional view of the locking device and securing-strap. Fig. 4 is a sectional view of the lock-case, showing one of the lower combination-disks. Fig. 5 is a cross-sectional view of the plunger-box, showing the cam for moving the plunger against the force of the spring.

Similar numbers of reference designate corresponding parts throughout.

In the drawings, 6 indicates the wheel of a bicycle, of which 7 is the tire. The mud-guard 8 is supported over this tire and is carried by the bicycle-frame 9, to a convenient portion of which the locking device is secured by a strap 10, having a threaded socket 11, into which a short threaded bolt 12 is screwed and is locked by the lock-nut 13, the strap 10 being tightened on the bicycle-frame by the screw 10'.

The case 14 of the locking device is formed in part with the bolt 12 or riveted thereto. This case 14 has the downwardly-extending plunger-case 15, provided with a chamber 16, in which the spring 17 operates. One or more metal disks 18 and 19 are held within the case 14 and are free to revolve therein on a shaft, the upper disk being provided with a stud 20, which is turned by the arm 21 on the collar 21', carried on a shaft, to the outer end of which is secured the operating-knob 22. Through this upper disk 18 is cut the circumferential slot 23, in which the pin 24 on the disk 19 moves until the end of the slot is reached, when the turning of the upper disk moves the lower disk in the same direction. These disks have, also, the straight slots 25 and 26, into which the tongue 27 on the upper end of the plunger is forced by the spring 17 when the combination is properly set.

The plunger 28 is free to move in the plunger-case 15, and has a stud 29 resting on the coiled spring 17, which tends to lift the plunger. In the face of the plunger-shaft a chamber 30 is formed, and against the lower portion of this chamber the cam 31 may be operated to depress the plunger against the force of the spring 17, this cam being secured to the shaft 32, journaled in the casing-cover 15', and operated by the knob 33, secured to the outer end of said shaft. The plunger 28 has also a downwardly-extending and bent arm 34, the end of which is adapted to be inserted between the mud-guard and the wheel-tire and carries a brake-shoe 35, secured thereto and adapted to press on the surface of the tire when the plunger is depressed. The case 14 is covered by the front plate 14', through which the shaft carrying the knob 22 passes, and this plate has a dial marked thereon to aid in adjusting the combination.

The case 14 need not be circular in shape, but may be oblong and may contain square or oblong plates instead of disks, the combination of which may be adjusted by moving these plates by a key. When the circular case is used, the disks 18 and 19 may be made somewhat smaller than the inner diameter, and one or more of these may be cam-shaped, as shown in dotted lines in Fig. 4, so that the turning of these disks by means of the arm 21 on the collar 21', carried by the shaft of the knob 22, will depress the plunger by the cam-disks moving over the shoulder 27, and thus dispensing with the cam 31 and its operating mechanism.

The shape of the strap 10 may be different to that shown, in order to clamp various parts of the bicycle-frame, and the lower end of the plunger may be shaped to engage with the sprocket-wheel, by which the bicycle is driven.

The operation of the device is very simple and will be readily understood by the above description and reference to the drawings. The combination may be readily changed by adjusting the collar 21' to bring the arm 21 in a different position.

Having thus described my invention, I claim as new and desire to secure by Letters Patent—

1. In a bicycle-lock, a series of interlocking metal disks moving over the end of a plunger to force the plunger into a position to lock the bicycle, and means for operating said disks, as described.

2. In a bicycle-lock, the combination, with a securing-strap, a case adjustably secured thereto, and a locking mechanism within said case, of a spring-operated plunger movable in said case, adapted to be locked against the force of the spring by such locking mechanism, as described.

3. In a bicycle-lock, the combination, with a case adapted to be secured to the bicycle-frame and containing a series of interlocking metal disks operated by suitable mechanism having slots extending inward from the edges thereof, of a spring-operated plunger having a shoulder adapted to enter such slots, as described.

4. In a bicycle-locking device, the combination, with a spring-lifted plunger working in a plunger-case and adapted when depressed to lock a movable portion of the bicycle, of a series of cam-shaped disks contained within the upper portion of said case, the edges of one or more of said disks bearing against the top of the plunger, and the arm 21 of the collar 21', carried on a shaft and operated by the knob 22 to rotate said disks by contact with a stud provided on the upper disk, as described.

5. The combination, with the case 14, adjustably secured to the fastening-strap 10 and containing a disk 18, having the slot 25 and circular slot 23 and provided with the stud 20, a disk 19, having the slot 26, a pin 24, adapted to interlock with the slot 23 of the plate 18, and an arm 21 on the collar 21', carried on a shaft journaled in the face-plate 14' and operated by the knob 22, of the spring-lifted plunger 28, movable in the case 15 and having the bent arm 34, provided with the brake-shoe 35, as described.

6. In a bicycle-locking device consisting of a case adapted to be adjustably secured to the bicycle-frame and containing a locking device of the nature described, the plunger 28, having the shoulder 27, stud 16, and slot 30, and a cam 31, working in said slot, carried on the shaft 32, journaled in the plate 15', and operated by the knob 33 to depress the plunger 28 against the force of the spring 17 exerted on the stud 16, as described.

ARTHUR W. HALL.

Witnesses:
HENRY J. MILLER,
JOSEPH A. MILLER, Jr.